Figure 1:
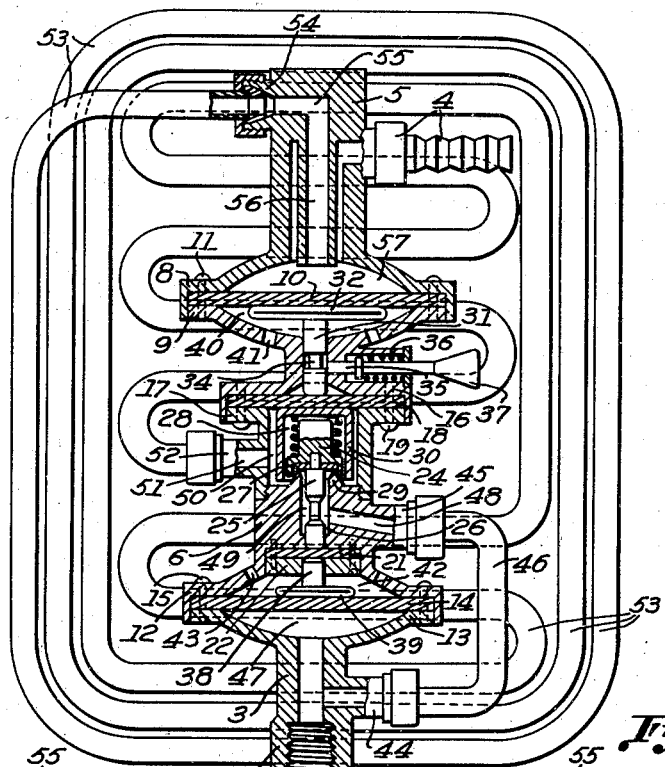

Aug. 19, 1941.  H. WENDLAND  2,252,905

SAFETY DEVICE FOR GAS SYSTEMS

Filed March 30, 1939

Inventor:
HEINRICH WENDLAND
By Ely Pattison
Attorneys.

Patented Aug. 19, 1941

2,252,905

UNITED STATES PATENT OFFICE 2,252,905

SAFETY DEVICE FOR GAS SYSTEMS

Heinrich Wendland, Halstenbek, near Pinneberg, Germany

Application March 30, 1939, Serial No. 264,960
In Germany September 5, 1938

8 Claims. (Cl. 48—192)

This invention relates to means for safeguarding against return flow of explosive gas mixtures in gas pipes and against subsequent explosions by using a closing member and a movable control member influenced by the explosion pressure. The known arrangements of this type require, in addition, water pockets or the like which constitute a considerable source of danger because of the uncertainty of a sufficient constant supply of liquid.

The object of the invention is to provide a dry safety device which acts even when the flow of combustible gas stops preparing the closure of the closure valve member in order to close the latter completely in the event of the combustible gas mixture flowing back and to hold it closed so that, as far as possible, even before the explosion takes place, the closure valve member is closed and is held against any swinging back into the open position.

This object is attained by a closure valve member being arranged in the gas pipe between two movable control members operating thereon in opposite directions, one of said control members being subjected to the pressure of the forward flow in the gas pipe in order to open the closure valve member. In this way, by using flexible membranes as the control member, the membrane disposed between the outflow side of the gas pipe and the closure valve member has a greater effective surface than the membrane disposed between the inflow side of the gas pipe and the closure valve member.

Figure 2:
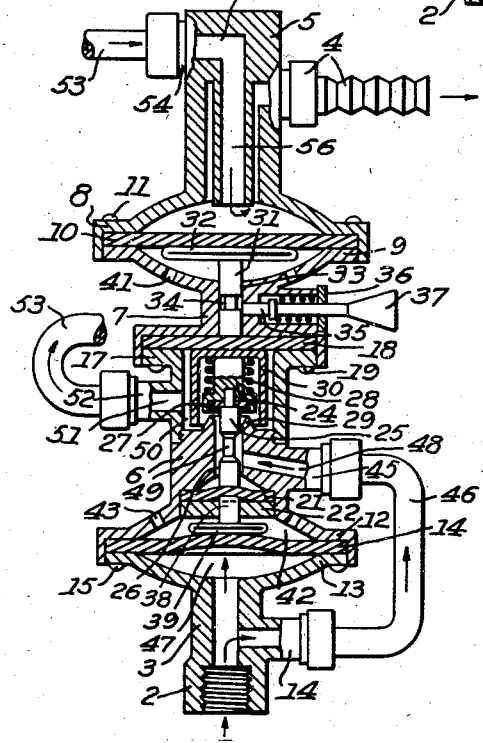
Figure 3:
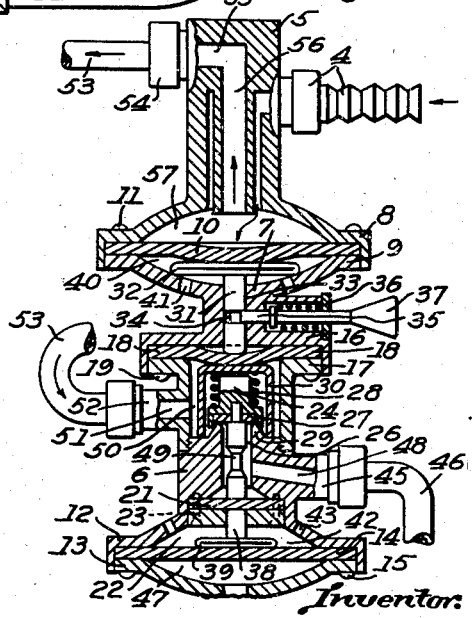

An embodiment of the invention is shown, by way of example, in the drawing, wherein:

Figure 1 is a section of the device partly in elevation showing it in the inoperative position, Figure 2 is the same device in section during normal operation in a position of superintending and Figure 3 is the same device with the closing member closed or blocked before or during an explosion.

I is the housing of the device which in the embodiment illustrated is made in four parts. The pipe for the combustible gas is connected to the union 2 of the housing part 3 whereas the combustible gas pipe leading to the welding or cutting burner is connected to the union 4 of the housing part 5. The housing parts 6 and 7 are disposed between the parts 3 and 5. A movable control membrane 10 is arranged as control member between the flanges 8 and 9 of the housing parts 5 and 7. The flanges 8 and 9 are connected together by bolts 11 which simultaneously keep the control membrane 10. Between the flanges 12 and 13 of the housing parts 3 and 6 is arranged, as a control member, a control membrane 14 which acts contrarily to the control member 10, the flanges being connected together by bolts 15 which also hold the control membrane 14. A movable membrane 18, serving as a sealing member, is disposed between the flanges 16 and 17 of the housing parts 6 and 7. The flanges 16 and 17 of the sealing membrane 18 are held together by bolts 19. At the lower end of the housing part 6 there is arranged a movable membrane 21 which serves as a sealing member and which is fixed with the annular flange 22 and bolts 23 to the housing part 6. The housing part 6 contains the closing member 24 with a guiding and control spindle 25, which is arranged to slide longitudinally in a passage 26 and bears on the sealing membrane 21. The closing member 24 rests, with a washer 27 of rubber or the like and under the influence of a spring 28, resiliently on a valve seating 29. A protective cap 30 surrounds the spring 28, which bears against the upper covering wall of said cap and forces it in the raised position against the sealing membrane 18. A spindle 31 carrying a plate 32 abuts against the top of the sealing membrane 18 with the plate 32 bearing against the underside of the control membrane 10. The spindle 31, which is guided longitudinally in a passage 33 of the housing part 7, is formed with an annular recess 34 which can engage, under the influence of a spring 36, a locking rod 35 guided at right angles to the control spindle 31 in the housing part 7. The locking rod 35 latched in the annular groove 34 can be pulled back into the superintending position by a handle 37. A spindle 38 having a plate 39 is arranged between control membrane 14 and the sealing membrane 21, the upper end of said spindle passing through the annular flange 22 and bearing against the sealing membrane 21 whereas the plate 39 rests at the lower end on the control membrane 14. The space 40 underneath the control membrane 10 is connected by openings 41 to atmosphere and the space 42 above the control membrane 14 is also connected to atmosphere by openings 43. A connecting pipe 45 is detachably arranged between a lateral union 44 of the housing part 3 and a union 45 of the housing part 6, said pipe connecting the space 47 underneath the control membrane 14 with the passage 26 surrounding the valve spindle 25 by way of the bore 48 in the union 45. In the vicinity of the bore 48 the valve spindle 25 is formed with an annular recess 49 and, if necessary, with longitudinal grooves for connection with the valve member space 50 through the valve seating 29 when the closing member 24 is opened. A bore 51 in the union 52 and a coiled delay pipe 53 having many turns and a minimum length of about 6 m. leads from this chamber 50 to the union 54 of the housing part 5, to the bore 55 with which is connected a passage or tube 56 and the space 57 above the control membrane 10. The space 57 is extended upwardly as far as the lateral union 4 to which is connected the tube or pipe leading to the burner. The delay pipe 53 is preferably arranged in one plane and in order to attain the necessary minimum length, is led in zig-zag windings and wound several times around its zigzag windings so that the device and the delay pipe can be fixed on a plate. The flanges 8, 16, 12 conveniently engage with an outer annular wall over the outer edges of the opposite flanges 9, 17, 13.

The operation of the safety device is as follows:

In the inoperative position the individual parts assume the positions shown in Figure 1 in which the closing member 24 bears under the influence of the spring 28 on the valve seating 29 and is closed.

If the closure valve at the combustible gas generating plant connected with the union 2 or at the welding, cutting or soldering burner connected with the union 4 is opened, then combustible gas flows from the combustible gas generating plant or storage container through the union 2 into the chamber 47, strikes the control membrane 14 and forces this upwardly so that the control spindle 38 with the plate 39, the sealing membrane 21 and the valve spindle 25 with the closing member 24, are raised slightly and the valve 24 is opened. The combustible gas can now flow through the union 44, the pipe 46, the union 45, its bore 48, the annular groove 49 of the valve spindle 25 and the intermediate space between the latter and the passage 26 into the valve chamber 50. From here the combustible gas flows through the bore 51 in the union 52, the delay pipe 53, the union 54, with the bore 55 and the passage 56 into the chamber 57 and the control membrane 10 and from here towards the burner through the union 4 and the pipe connected thereto. During normal working the individual parts of the safety device then assume the position shown in Figure 2 and the combustible gas flows in the direction of the arrow.

If the flow of combustible gas is throttled or stops due to obstruction of the burner or of the burner nozzle, or for other reasons, then the control membrane 10, which is made somewhat larger than the control membrane 14, is affected by the pressure of the combustible gas and is caused to flex downwardly. Thus the spindle 31 with its plate 32 and the sealing membrane 18 are also moved or flexed, respectively, in a downward direction and press on the cap 30 and the closing member 24 disposed underneath the latter.

At the same time, the counter-pressure spring 28 also becomes operative and presses on the valve 24, partly because of the lowering contrary effect of the pressure of the flow of combustible gas and partly because of the pressure of the sealing membrane 18 from above, so that the spring 28 closes the valve 24 more and more. If now, due to the blocked burner or other interruptions, there takes place a return flow of oxygen in the combustible gas pipe and into the space 57 above the control membrane 10, then the downward flexing of the control membrane 10 and the pressure on the valve 24 are increased in the closing direction. If the control spindle 31 moves downwardly to such an extent that its annular groove 34 comes opposite the blocking rod 35, the rod 35 is forced by the spring 36 into the groove 34 and holds the spindle 31 in the position in which the valve 24 is closed. The oxygen or the explosive gas mixture can therefore only penetrate as far as the valve chamber 50, which is separated by the closed valve 24 from the combustible gas pipe leading to the generating or storage container. Subsequently, if upon extinguishing of the gas flame at the burner nozzle and then re-lighting of the burner, the gas mixture in the supply pipe becomes ignited, the piercing flame is stopped in the valve chamber 50. In this chamber 50, the counter-pressure spring 28 and the valve 24 are protected from the flame by the cap 30. The closing and blocking of the valve 24 is thus effected not by the explosion pressure produced by the flame striking back, but has already been effected by the slower flow of combustible gas in the direction of the burner slackening or being stopped. In so far as this is not entirely sufficient to close and block the valve 24, this preventive measure is brought about by the oxygen creeping back raising the pressure in the chamber 57. The operator at the burner may, however, be already warned by the movement of the blocking rod 35, which can be seen from outside, so that he does not re-ignite the extinguished flame, by which the striking back of the piercing flame is produced. If the delay pipe 53 is of sufficient length, the certainty that the closing and blocking of the valve 24 will take place before the piercing flame reaches the valve chamber 50 is further increased. After examining the burner and the pipe between the burner and the safety device, or by reduced pressure in the combustible gas generating container of the entire plant, the blocking rod 35 can be withdrawn from its blocking position within the groove 34 of the spindle 31 to the non-blocking position before the plant is again set in operation, and the entire device returns to the position of readiness according to Figure 2. The embodiment shown and described may undergo numerous modifications in order to adapt it to any particular use without departing from the scope of the invention. The controlling and sealing members 10, 18, 21, 14 may also be made as tube membranes, pistons, or the like. The closing member 24 may be provided on its side facing the inflow side of the combustible gas with a larger effective surface than the other side, in which case, the spring 28 can be made stronger and the device more sensitive so that the closing of the valve takes place more promptly.

I claim:

1. Safety device for gas systems against return flow of explosive gas mixtures in gas pipes and against subsequent explosions comprising a closing member, two movable control members arranged on opposite sides of said closing member and operatively connected thereto, one of said control members being disposed between the inflow side of the valve device and the closing member, said control member being subjected to the forward flow pressure of the gas before said closing member and adapted to hold the closing member in the open position during the normal condition of the gas system, the other control member being disposed between the outflow side of the valve device and the closing member, adapted to close said closing member at the return flow of explosive gas mixtures or the subsequent explosion.

2. Safety device for gas systems against return flow of explosive gas mixtures in gas pipes and against subsequent explosion comprising a closing member, two movable control members arranged on opposite sides of said closing member and operatively connected thereto, one of said control members being disposed between the inflow side of the valve device and the closing member, said control member being subjected to the forward flow pressure of the gas before said closing member and adapted to hold the closing member in the open position during the normal condition of the gas system and the other control member being disposed between the outflow side of the valve device and the closing member and made of a larger effective surface than the other control member, adapted to close said closing member at the return flow of explosive gas mixtures or the subsequent explosion, a counter pressure spring between said closing member and the control membrane on the outflow side of the valve device adapted to influence said closing member yieldably in the closing direction.

3. Safety device for gas systems against return flow of explosive gas mixtures in gas pipes and against subsequent explosions comprising a closing member, two movable control members on opposite sides of said closing member and operatively connected thereto, one of said control members being disposed between the inflow side of the valve device and the closing member, said control member being subjected to the forward flow pressure of the gas before said closing member and adapted to hold the closing member in the open position during the normal condition of the gas system and the other control member being disposed between the outflow side of the valve device and the closing member and made of a larger effective surface than the other control member adapted to close said closing member at the return flow of explosive gas mixtures or the subsequent explosion, a counter pressure spring between said closing member and the control membrane on the outflow side of the valve device adapted to influence said closing member yieldably in the closing direction, and a cap or casing surrounding said spring adapted to protect said spring against the explosion heat from the outflow side of the valve device during explosion.

4. Safety device for gas systems against return flow of explosive gas mixtures in gas pipes and against subsequent explosion comprising a closing member, two movable control membranes arranged on opposite sides of said closing member and operatively connected thereto, one of said control membranes being disposed between the outflow side of the valve device and the closing member, the other control membrane being disposed between the inflow side of the valve device and the closing member and subjected to the forward flow pressure of the gas, adapted to hold the closing member yieldingly in the open position during the normal condition of the gas system, a counter pressure chamber for each control membrane, a valve chamber for said closing member and flexible sealing members on opposite sides of said valve chamber between said valve chamber and said counterpressure chambers.

5. Safety device for gas systems against return flow of explosive gas mixtures in gas pipes and against subsequent explosion comprising a closing member, two movable control membranes arranged on opposite sides of said closing member and operatively connected thereto, one of said control membranes being disposed between the outflow side of the valve device and the closing member, the other control membrane being disposed between the inflow side of the valve device and the closing member and subjected to the forward flow pressure of the gas, interconnecting pieces between said control membranes and said closing member, a valve chamber for said closing member and flexible sealing members on opposite sides of said valve chamber, an annular groove in said interconnecting piece between the closing member and said control member on the outflow side of the valve device, a resiliently loaded locking stem cooperating with said annular groove when the closing member is closed.

6. Safety device for gas systems against return flow of explosive gas mixtures in gas pipes and against subsequent explosion comprising a closing member, two movable control membranes, arranged on opposite sides of said closing member and operatively connected thereto, one of said control membranes being disposed between the outflow side of the valve device and the closing member the other control membrane being disposed between the inflow side of the valve device and the closing member and subjected to the forward flow pressure of the gas, a valve chamber for said closing member, flexible sealing members on the inflow and outflow side of said valve chamber, interconnecting pieces between said sealing member and said control membrane on the outflow side and at opposite sides of said sealing member on the inflow side.

7. Safety device for gas systems against return flow of explosive gas mixtures in gas pipes and against subsequent explosion comprising a closing member, two movable control membranes arranged on opposite sides of said closing member and operatively connected thereto, one of said control membranes being disposed between the outflow side of the valve device and the closing member, the other control membrane being disposed between the inflow side of the valve device and the closing member and subjected to the forward flow pressure of the gas, a valve chamber for said closing member, flexible sealing members on the inflow and outflow side of said valve chamber interconnecting pieces between said sealing member and said control membrane on the outflow side and at opposite sides of said sealing member on the inflow side, the ends of said interconnected pieces being in contact with said control membranes having plate-like enlargements to form abutment surfaces for said control membranes.

8. Safety device for gas systems against return flow of explosive gas mixtures in gas pipes and against subsequent explosion comprising a casing, a valve chamber, a closing member within said valve chamber, two movable control members operatively connected to said closing member, sealing members at the inflow and outflow side of said valve chamber, interconnecting pieces between said sealing member and said control membrane on the outflow side and at opposite sides of said sealing member on the inflow side, a pressure chamber at one side of each control member at the inflow side and the outflow side of the valve device, connecting pipes between each pressure chamber and said valve chamber, the pipe between the pressure chamber on the outflow side and the valve chamber having frequent turns and a length of more than eighteen feet, interconnecting pieces between said sealing member and said control member on the outflow side and on opposite sides of the sealing member at the inflow side of the valve chamber.

HEINRICH WENDLAND.